US011326404B2

(12) United States Patent
Omrani

(10) Patent No.: US 11,326,404 B2
(45) Date of Patent: May 10, 2022

(54) TRIPPING SPEED MODIFICATION

(71) Applicant: Ensco International Incorporated, Wilmington, DE (US)

(72) Inventor: Ala Eddine Omrani, Houston, TX (US)

(73) Assignee: Ensco International Incorporated, Wilmington, DE (US)

( * ) Notice: Subject to any disclaimer, the term of this patent is extended or adjusted under 35 U.S.C. 154(b) by 206 days.

(21) Appl. No.: 16/176,728

(22) Filed: Oct. 31, 2018

(65) Prior Publication Data

US 2019/0128079 A1 May 2, 2019

Related U.S. Application Data

(60) Provisional application No. 62/580,411, filed on Nov. 1, 2017.

(51) Int. Cl.

| | |
|---|---|
| ***E21B 19/20*** | (2006.01) |
| ***E21B 44/02*** | (2006.01) |
| ***E21B 47/12*** | (2012.01) |
| *G05B 11/32* | (2006.01) |
| *G05D 13/62* | (2006.01) |

(52) U.S. Cl.

CPC .............. *E21B 19/20* (2013.01); *E21B 44/02* (2013.01); *E21B 47/12* (2013.01); *G05B 11/32* (2013.01); *G05D 13/62* (2013.01)

(58) Field of Classification Search

CPC .......... E21B 19/20; E21B 44/02; E21B 47/12; E21B 19/00; G05B 11/32; G05D 13/62

See application file for complete search history.

(56) References Cited

U.S. PATENT DOCUMENTS

| | | | |
|---|---|---|---|
| 2003/0221519 A1 | 12/2003 | Haugen | |
| 2013/0231787 A1* | 9/2013 | Chapman | E21B 44/00 700/282 |
| 2014/0124218 A1 | 5/2014 | Pilgrim | |
| 2016/0138395 A1 | 5/2016 | Kulkarni et al. | |
| 2017/0152736 A1 | 6/2017 | Kyllingstad | |
| 2017/0300845 A1 | 10/2017 | Mandava et al. | |
| 2017/0314368 A1* | 11/2017 | Wise | E21B 41/0092 |

FOREIGN PATENT DOCUMENTS

| | | |
|---|---|---|
| NO | 851154 | 10/1985 |
| WO | 2010098672 | 9/2010 |
| WO | 2011093716 | 8/2011 |
| WO | 2014066386 | 5/2014 |
| WO | 2014088417 | 6/2014 |
| WO | 2016089364 | 6/2016 |
| WO | 2016197255 | 12/2016 |

OTHER PUBLICATIONS

PCT Application No. PCT/US2018/058630, International Search Report and Written Opinion, dated Feb. 19, 2019, 16 pgs.

EP Application No. 18874688.7 Extended Search Report dated Jun. 24, 2021, 7 pgs.

* cited by examiner

*Primary Examiner* — Tejal Gami

(74) *Attorney, Agent, or Firm* — Fletcher Yoder, P.C.

(57) ABSTRACT

A system includes a processing device configured to determine a tripping operation to be undertaken. The processing device is configured to also calculate a variable tripping speed for the tripping operation to vary a speed of the tripping operation. The processing device is further generate an output to control the operation of a portion of a continuous tripping system to implement the tripping operation at the variable tripping speed.

19 Claims, 10 Drawing Sheets

35 22 36 38 40 44 42 37 64 43 68 24 2A 2A 20 46 26 70 72 34 32 30 28

TRIPPING SPEED MODIFICATION

CROSS REFERENCE TO RELATED APPLICATIONS

This application is a Non-Provisional Application claiming priority to U.S. Provisional Patent Application No. 62/580,411, entitled "Tripping Speed Modification", filed Nov. 1, 2017, which is herein incorporated by reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Advances in the petroleum industry have allowed access to oil and gas drilling locations and reservoirs that were previously inaccessible due to technological limitations. For example, technological advances have allowed drilling of offshore wells at increasing water depths and in increasingly harsh environments, permitting oil and gas resource owners to successfully drill for otherwise inaccessible energy resources. Likewise, drilling advances have allowed for increased access to land based reservoirs.

Much of the time spent in drilling to reach these reservoirs is wasted "non-productive time" (NPT) that is spent in doing activities which do not increase well depth, yet may account for a significant portion of costs. For example, when drill pipe is pulled out of or lowered into a previously drilled section of well it is generally referred to as "tripping." Accordingly, tripping-in may include lowering drill pipe into a well (e.g., running in the hole or RIH) while tripping-out may include pulling a drill pipe out of the well (pulling out of the hole or POOH). Tripping operations may be performed to, for example, install new casing, change a drill bit as it wears out, clean and/or treat the drill pipe and/or the wellbore to allow more efficient drilling, run in various tools that perform specific jobs required at certain times in the oil well construction plan, etc. However, the tripping process may also lead to well pressure variations, for example, due to the movement of the drill string resulting in additional drag, inertial and local resistances, and pressure losses. Such pressure variations may induce surge and swab pressures that could affect the well stability leading to a well control intervention.

DETAILED DESCRIPTION

Figure 1:
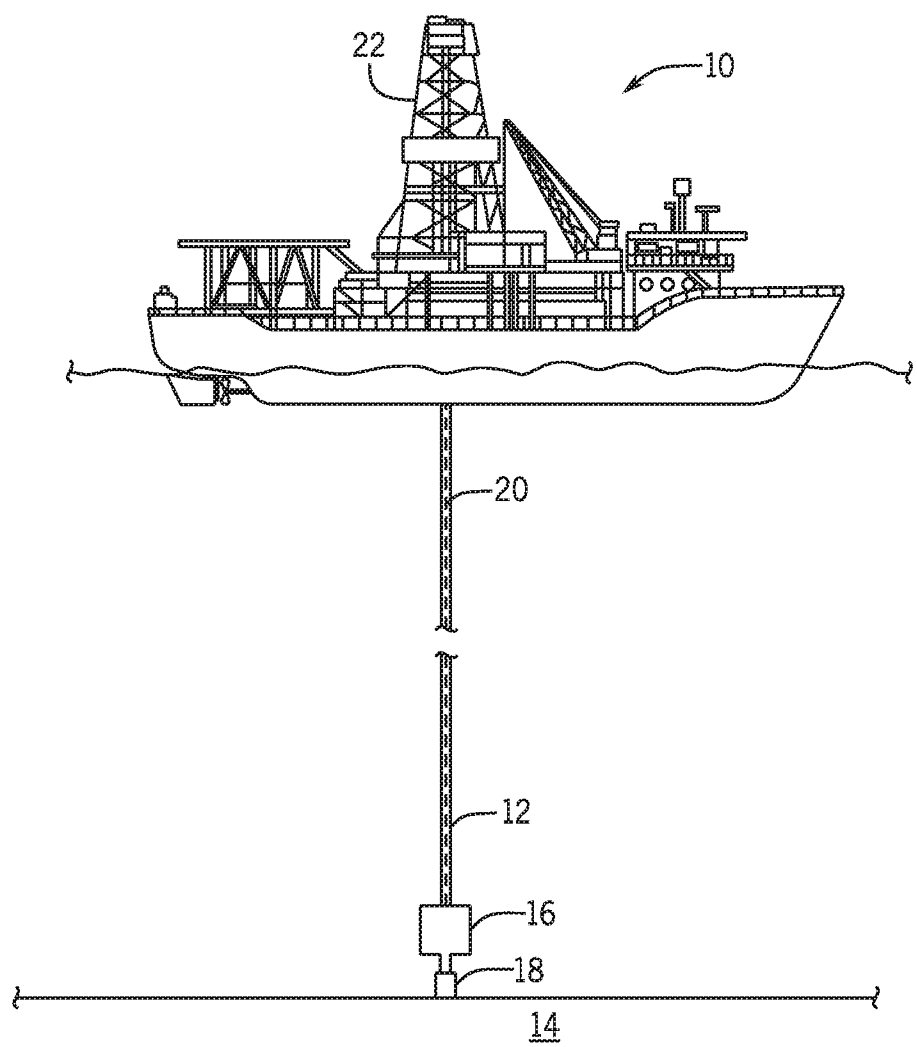
FIG. 1 illustrates an example of an offshore platform having a riser coupled to a blowout preventer (BOP), in accordance with an embodiment.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Present embodiments are directed to components, systems, and techniques (e.g., a tripping speed determination system) utilized in conjunction with a continuous tripping system. Pressure variations that may occur during continuous tripping induce surge and swab pressures that could affect the well stability leading to a well control intervention. Surges (or surge pressures) may describe an increase in pressures in a well (e.g., an increase in a pressure generated by drilling fluid in the well) based upon a tripping-in operation inclusive of movement of a drill string when lowering drill pipe into a well (e.g., running in the hole or RIH), for example, due to frictional forces between the movement of the pipe and the drilling fluid (e.g., drilling mud). Swabs (or swab pressures) may describe a decrease in pressures in a well (e.g., a decrease in a pressure generated by drilling fluid in the well) based upon a tripping-out operation inclusive of movement of a drill string when pulling a drill pipe out of the well (pulling out of the hole or POOH), for example, due to frictional forces between the movement of the pipe and the drilling fluid (e.g., drilling mud).

Accordingly, present embodiments are related to determination and/or control of surge and swab pressure variations with respect to pore pressures (e.g., the pressure of fluids within the pores of a formation rock) and/or fracture pressures (e.g., pressures above which injection of fluids will cause a formation to hydraulically fracture), for example, to avoid undesirable influxes or mud losses. In some embodiments, this may be accomplished through the use of a hardware suite of one or more processors, as well as a suite of one or more software programs (e.g., instructions configured to be executed by a processor, whereby the instructions are stored on a tangible, non-transitory computer-readable medium such as memory) that may operate in conjunction to determine limiting speeds for continuous tripping operations and, in some embodiments, operate to control speeds of continuous tripping operations.

With the foregoing in mind, FIG. 1 illustrates an offshore platform 10 as a drillship. Although the presently illustrated embodiment of an offshore platform 10 is a drillship (e.g., a ship equipped with a drilling system and engaged in offshore oil and gas exploration and/or well maintenance or completion work including, but not limited to, casing and tubing installation, subsea tree installations, and well capping), other offshore platforms 10 such as a semi-submersible platform, a jack up drilling platform, a spar platform, a floating production system, or the like may be substituted for the drillship. Indeed, while the techniques and systems described below are described in conjunction with a drillship, the techniques and systems are intended to cover at least the additional offshore platforms 10 described above. Likewise, while an offshore platform 10 is illustrated and described in FIG. 1, the techniques and systems described herein may also be applied to and utilized in onshore (e.g., land based) drilling activities. These techniques may also apply to at least vertical drilling or production operations (e.g., having a rig in a primarily vertical orientation drill or produce from a substantially vertical well) and/or directional drilling or production operations (e.g., having a rig in a primarily vertical orientation drill or produce from a substantially non-vertical or slanted well or having the rig oriented at an angle from a vertical alignment to drill or produce from a substantially non-vertical or slanted well).

As illustrated in FIG. 1, the offshore platform 10 includes a riser string 12 extending therefrom. The riser string 12 may include a pipe or a series of pipes that connect the offshore platform 10 to the seafloor 14 via, for example, a BOP 16 that is coupled to a wellhead 18 on the seafloor 14. In some embodiments, the riser string 12 may transport produced hydrocarbons and/or production materials between the offshore platform 10 and the wellhead 18, while the BOP 16 may include at least one BOP stack having at least one valve with a sealing element to control wellbore fluid flows. In some embodiments, the riser string 12 may pass through an opening (e.g., a moonpool) in the offshore platform 10 and may be coupled to drilling equipment of the offshore platform 10. As illustrated in FIG. 1, it may be desirable to have the riser string 12 positioned in a vertical orientation between the wellhead 18 and the offshore platform 10 to allow a drill string made up of drill pipes 20 to pass from the offshore platform 10 through the BOP 16 and the wellhead 18 and into a wellbore below the wellhead 18. Also illustrated in FIG. 1 is a drilling rig 22 (e.g., a drilling package or the like) that may be utilized in the drilling and/or servicing of a wellbore below the wellhead 18.

Figure 2:
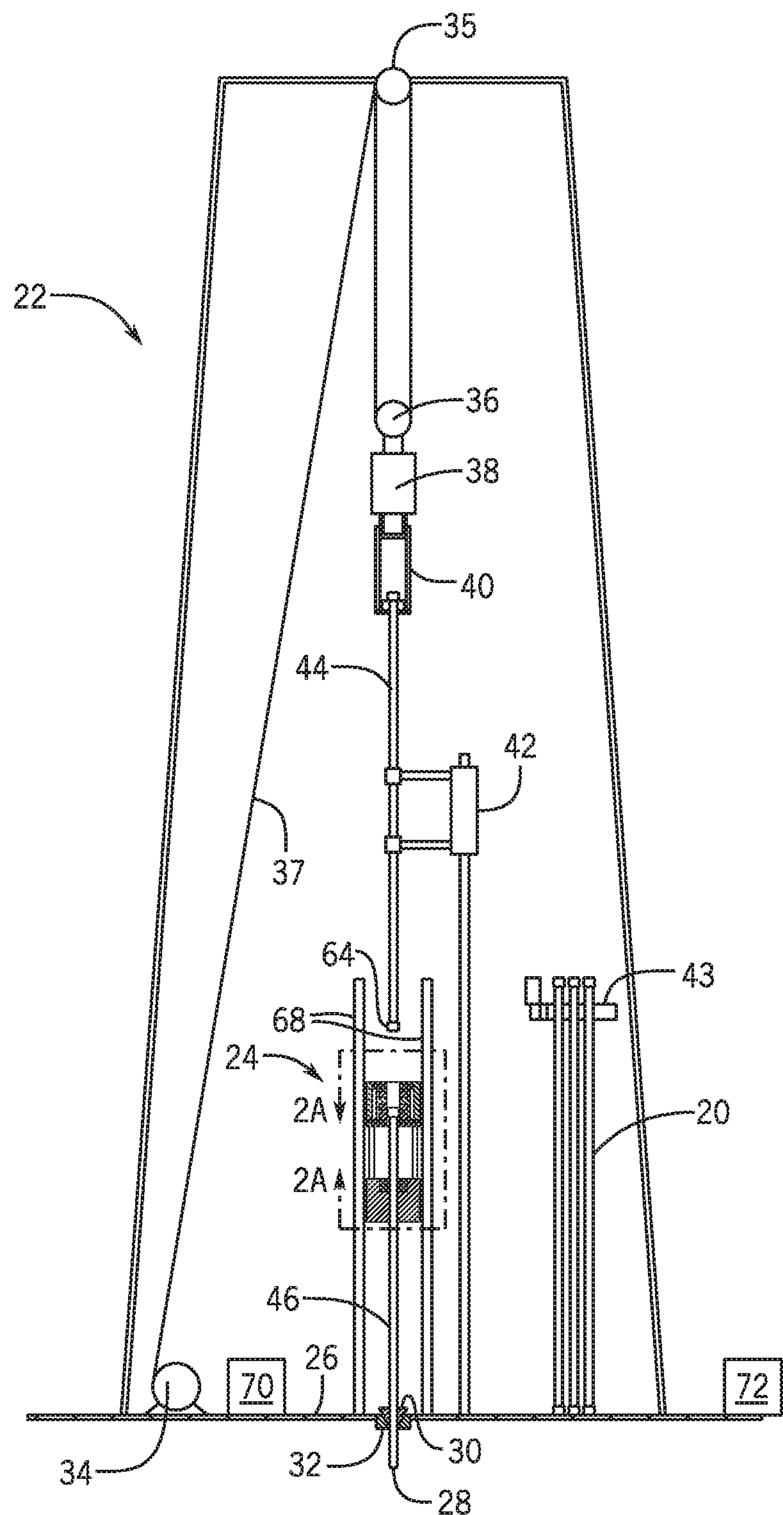
FIG. 2 illustrates a front view a drilling rig as illustratively presented in FIG. 1, in accordance with an embodiment.

In a tripping-in operation consistent with embodiments of the present disclosure, as depicted in FIG. 2, a tripping apparatus 24 is positioned on the drilling floor 26 in the drilling rig 22 above the wellbore 28 (e.g., the drilled hole or borehole of a well which may be, as illustrated in FIG. 2, proximate to the drilling floor 26 in land based drilling operations or which may be, in conjunction with FIG. 1, below the wellhead 18). The drilling rig 22 may include one or more of, for example, the tripping apparatus 24, floor slips 30 positioned in rotary table 32, drawworks 34, a crown block 35, a travelling block 36, a top drive 38, an elevator 40, and a tubular handling apparatus 42. The tripping apparatus 24 may operate to couple and decouple tubular segments (e.g., drill pipe 20 to and from a drill string) while the floor slips 30 may operate to close upon and hold a drill pipe 20 and/or the drill string passing into the wellbore 28. The rotary table 32 may be a rotatable portion of the drilling floor 26 that may operate to impart rotation to the drill string either as a primary or a backup rotation system (e.g., a backup to the top drive 38).

The drawworks 34 may be a large spool that is powered to retract and extend drilling line 37 (e.g., wire cable) over a crown block 35 (e.g., a vertically stationary set of one or more pulleys or sheaves through which the drilling line 37 is threaded) and a travelling block 36 (e.g., a vertically movable set of one or more pulleys or sheaves through which the drilling line 37 is threaded) to operate as a block and tackle system for movement of the top drive 38, the elevator 40, and any tubular member (e.g., drill pipe 20) coupled thereto. The top drive 38 may be a device that provides torque to (e.g., rotates) the drill string as an alternative to the rotary table 32 and the elevator 40 may be a mechanism that may be closed around a drill pipe 20 or other tubular members (or similar components) to grip and hold the drill pipe 20 or other tubular members while those members are moving vertically (e.g., while being lowered into or raised from the wellbore 28). The tubular handling apparatus 42 may operate to retrieve a tubular member from a storage location 43 (e.g., a pipe stand) and position the tubular member during tripping-in to assist in adding a tubular member to a tubular string. Likewise, the tubular handling apparatus 42 may operate to retrieve a tubular member from a tubular string and transfer the tubular member to a storage location 43 (e.g., a pipe stand) during tripping-out to remove the tubular member from the tubular string.

Figure 2A:
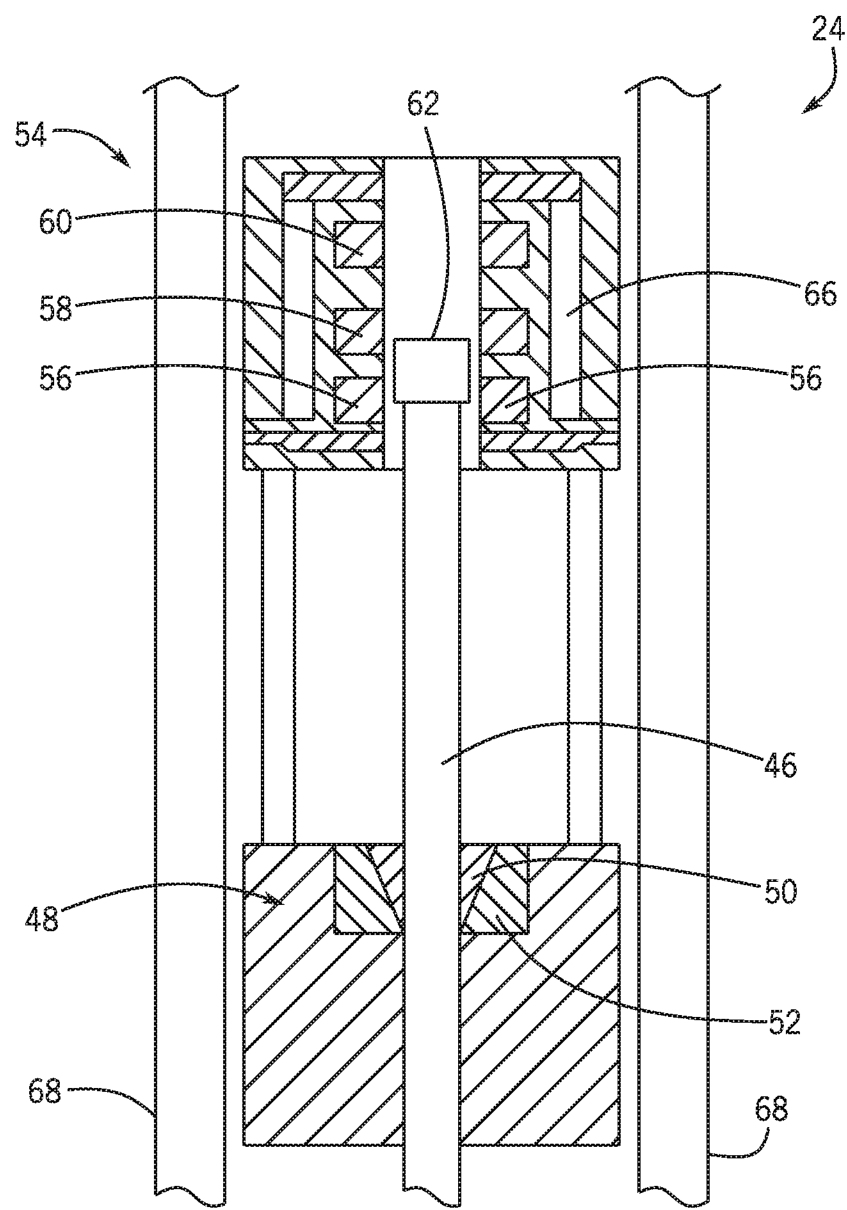
FIG. 2A illustrates a front view of the tripping apparatus of FIG. 2, in accordance with an embodiment.

During a tripping-in operation, the tubular handling apparatus 42 may position a first tubular segment 44 (e.g., a first drill pipe 20) so that the segment 44 may be grasped by the elevator 40. The elevator 40 may be lowered, for example, via the block and tackle system towards the tripping apparatus 24 to be coupled to a second tubular segment 46 (e.g., a second drill pipe 20) as part of a drill string. As illustrated in FIG. 2A, the tripping apparatus 24 may include tripping slips 48 inclusive of slip jaws 50 that engage and hold the second tubular segment 46 as well as a forcing ring 52 that operates to provide force to actuate the slip jaws 50. The tripping slips 48 may, thus, be activated to grasp and support the segment, and, accordingly, an associated tubular string (e.g., drill string) when the tubular string is disconnected from the block and tackle system. The tripping slips 48 may be actuated hydraulically, electrically, pneumatically, or via any similar technique.

The tripping apparatus 24 may further include a roughneck 54 that may operate to selectively make-up and breakout a threaded connection between tubular segments 44 and 46 in a tubular string. In some embodiments, the roughneck 54 may include one or more of fixed jaws 56, makeup/breakout jaws 58, and a spinner 60. In some embodiments, the fixed jaws 56 may be positioned to engage and hold the second (lower) tubular segment 46 below a threaded joint 62 thereof. In this manner, when the first (upper) tubular segment 44 is positioned coaxially with the second tubular segment 46 in the tripping apparatus 24, the second tubular segment 46 may be held in a stationary position to allow for the connection of the first tubular segment 44 and the second tubular segment (e.g., through connection of the threaded joint 62 of the second tubular segment 46 and a threaded joint 64 of the first tubular segment 44).

To facilitate this connection, the spinner 60 and the makeup/breakout jaws 58 may provide rotational torque. For example, in making up the connection, the spinner 60 may engage the first tubular segment 44 and provide a relatively high-speed, low-torque rotation to the first tubular segment 44 to connect the first tubular segment 44 to the second tubular segment 46. Likewise, the makeup/breakout jaws 58 may engage the first tubular segment 44 and may provide a relatively low-speed, high-torque rotation to the first tubular segment 44 to provide, for example, a rigid connection between the tubular segment 44 and 46. Furthermore, in breaking-out the connection, the makeup/breakout jaws 58 may engage the first tubular segment 44 and impart a relatively low-speed, high-torque rotation on the first tubular segment 44 to break the rigid connection. Thereafter, the spinner 60 may provide a relatively high-speed, low-torque rotation to the first tubular segment 44 to disconnect the first tubular segment 44 from the second segment 46.

In some embodiments, the roughneck 54 may further include a mud bucket 66 that may operate to capture drilling fluid, which might otherwise be released during, for example, the break-out operation. In this manner, the mud bucket 66 may operate to prevent drilling fluid from spilling onto drill floor 26. In some embodiments, the mud bucket 66 may include one or more seals that aid in fluidly sealing the mud bucket 66 as well as a drain line that operates to allow drilling fluid contained within mud bucket 66 to return to a drilling fluid reservoir.

Returning to FIG. 2, the tripping apparatus 24 may be movable with respect to the drill floor 26 (e.g., towards and away from the drill floor 26) and, in some embodiments, relative to the tripping slips 48. In other embodiments, the tripping apparatus 24 can be moved along the direction of the rig towards and away from the drilling floor 26 in conjunction with slanted well operations when the rig is oriented at an angle from a vertical alignment to respectively drill or produce from a substantially non-vertical or slanted well. Movement of the tripping apparatus 24 may be accomplished through the use of hydraulic pistons, jackscrews, racks and pinions, cable and pulley, a linear actuator, or the like along one or more supports 68. This movement may be beneficial to aid in proper location of the roughneck 54 during a make-up or break-out operation (e.g., during a tripping-in or tripping-out operation).

In some embodiments, moving of the tripping apparatus 24 into position (whether in conjunction with a continuous tripping operation in which the tubular segments 44 and 46 are moving towards or away from the drill floor 26 while being made-up or broken-out or in conjunction with a static tripping operation in which the tubular segments 44 and 46 remain in a static position relative to the drill floor 26 while being made-up or broken-out) may be undertaken in conjunction with a tripping operation at a fixed speed. However, it may be advantageous to instead utilize techniques and one or more systems to determine a variable speed for the tripping operation undertaken in conjunction with the tripping apparatus 24 to facilitate a make-up or break-out (e.g., tripping) operation at speeds that may be variable based upon sensitivities of surge and swab pressures.

To facilitate this determination of when to adjust the speeds of a tripping operation, a computing system 70 may be present and may operate to control the speed of a tripping operation (e.g., to control the rate and/or timing of moving tripping apparatus 24 into position as well as the operation of the tripping apparatus 24 as well as to control the rate and/or timing of the operation of the floor slips 30 positioned in rotary table 32, the drawworks 34, the top drive 38, the elevator 40, the tubular handling apparatus 42, for example. This control of the speed of a tripping operation may be based on, for example, determined or calculated pressure values (e.g., pore pressures, fracture pressures, etc.) for a well in which drill pipe 20 is present as well as surge and/or swab pressures related to the determined or calculated pressure values at various tripping operation speeds. In some embodiments, the computing system 70 may be communicatively coupled to a separate main control system 72, for example, a control system in a driller's cabin that may provide a centralized control system for drilling controls, automated pipe handling controls, and the like. In other embodiments, the computing system 70 may be a portion of the main control system 72 (e.g., the control system present in the driller's cabin).

Figure 3:
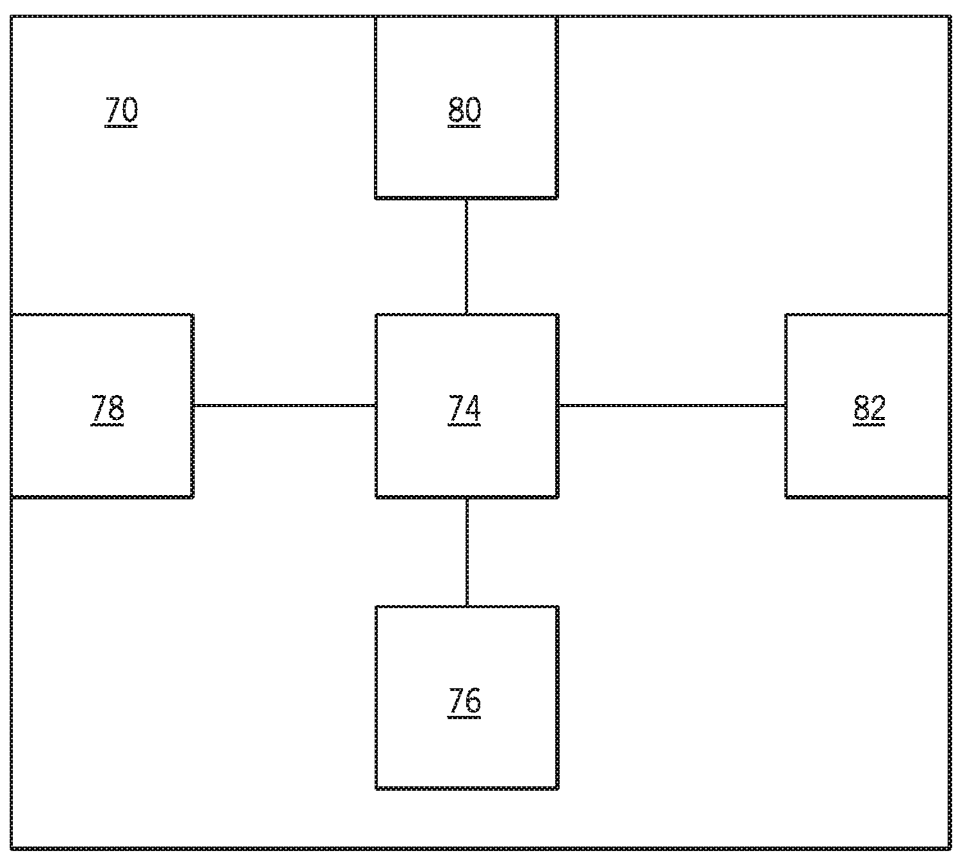
FIG. 3 illustrates a block diagram of a computing system of FIG. 2, in accordance with an embodiment.

FIG. 3 illustrates the computing system 70. It should be noted that the computing system 70 may be a standalone unit (e.g., a control monitor) that may operate to generate output control signals (e.g., to form a control system). Likewise, the computing system 70 may be configured to operate in conjunction with the tripping apparatus 24, one or more of the drawworks 34, the top drive 38, and the elevator 40, and/or the tubular handling apparatus 42. The computing system 70 may be a general purpose or a special purpose computer that includes a processing device 74, such as one or more application specific integrated circuits (ASICs), one or more processors, or another processing device that interacts with one or more tangible, non-transitory, machine-readable media (e.g., memory 76) of the computing system 70, which may operate to collectively store instructions executable by the processing device 74 to perform the methods and actions described herein. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by the processing device 74. In some embodiment, the instructions executable by the processing device 74 are used to generate, for example, control signals to be transmitted to, for example, one or more of the tripping apparatus 24 (e.g., the roughneck 54 and/or one or more of the fixed jaws 56, the makeup/breakout jaws 58, and the spinner 60), the tubular handling apparatus 42, one or more of the drawworks 34, the top drive 38, and the elevator 40 or a controller thereof, and/or the main control system 72 (e.g., to be utilized in the control of the tripping apparatus 24, the roughneck 54, the fixed jaws 56, the makeup/breakout jaws 58, the spinner 60, the drawworks 34, the top drive 38, the elevator 40, and/or the tubular handling apparatus 42) to operate in a manner described herein.

The computing system 70 may operate in conjunction with software systems implemented as computer executable instructions stored in a non-transitory machine readable medium of computing system 70, such as memory 76, a hard disk drive, or other short term and/or long term storage.

Particularly, the processing device 74 may operate in conjunction with software systems implemented as computer executable instructions (e.g., code) stored in a non-transitory machine readable medium of computing system 70, such as memory 76, that may be executed to receive information (e.g., signals or data) related to sensitivities of surge and/or swab pressures characteristics as well as well pressure characteristics. This information can be used by the computing system 70 (e.g., by the processing device 74 executing computer executable instructions stored in memory 76) to generate or otherwise calculate a tripping schedule that may be utilized to limiting tripping operation speeds to predetermined levels at predetermined times and/or well depths. Additionally, this determined tripping schedule can be used to initiate or control movement and/or operation of the tripping apparatus 24 and/or the associated tripping elements (e.g., the drawworks 34, the top drive 38, the elevator 40, and/or the tubular handling apparatus 42) to facilitate a make-up or break-out (e.g., tripping) operation by the computing system 70, the main control system 72, or by local controller(s) of the tripping apparatus 24 and/or the associated tripping elements (e.g., the drawworks 34, the top drive 38, the elevator 40, and/or the tubular handling apparatus 42).

In some embodiments, the computing system 70 may also include one or more input structures 78 (e.g., one or more of a keypad, mouse, touchpad, touchscreen, one or more switches, buttons, or the like) to allow a user to interact with the computing system 70, for example, to start, control, or operate a graphical user interface (GUI) or applications running on the computing system 70 and/or to start, control, or operate the tripping apparatus 24 (e.g., the roughneck 54 and/or one or more of the fixed jaws 56, the makeup/breakout jaws 58, and the spinner 60), the tubular handling apparatus 42, and/or additional systems of the drilling rig 22. Additionally, the computing system 70 may include a display 80 that may be a liquid crystal display (LCD) or another type of display that allows users to view images generated by the computing system 70. The display 80 may include a touch screen, which may allow users to interact with the GUI of the computing system 70. Likewise, the computing system 70 may additionally and/or alternatively transmit images to a display of the main control system 72, which itself may also include a processing device 74, a non-transitory machine readable medium, such as memory 76, one or more input structures 78, a display 80, and/or a network interface 82.

Returning to the computing system 70, as may be appreciated, the GUI may be a type of user interface that allows a user to interact with the computer system 70 and/or the computer system 70 and one or more sensors that transmit data to the computing system through, for example, graphical icons, visual indicators, and the like. Additionally, the computer system 70 may include network interface 82 to allow the computer system 70 to interface with various other devices (e.g., electronic devices). The network interface 82 may include one or more of a Bluetooth interface, a local area network (LAN) or wireless local area network (WLAN) interface, an Ethernet or Ethernet based interface (e.g., a Modbus TCP, EtherCAT, and/or ProfiNET interface), a field bus communication interface (e.g., Profibus), a/or other industrial protocol interfaces that may be coupled to a wireless network, a wired network, or a combination thereof that may use, for example, a multi-drop and/or a star topology with each network spur being multi-dropped to a reduced number of nodes.

In some embodiments, one or more of the tripping apparatus 24 (and/or a controller or control system associated therewith), the tubular handling apparatus 42 (and/or a controller or control system associated therewith), associated tripping elements (e.g., the drawworks 34, the top drive 38, the elevator 40, and/or the tubular handling apparatus 42), and/or the main control system 72 may each be a device that can be coupled to the network interface 82. In some embodiments, the network formed via the interconnection of one or more of the aforementioned devices should operate to provide sufficient bandwidth as well as low enough latency to exchange all required data within time periods consistent with any dynamic response requirements of all control sequences and closed-loop control functions of the network and/or associated devices therein. It may also be advantageous for the network to allow for sequence response times and closed-loop performances to be ascertained, the network components should allow for use in oilfield/drillship environments (e.g., should allow for rugged physical and electrical characteristics consistent with their respective environment of operation inclusive of but not limited to withstanding electrostatic discharge (ESD) events and other threats as well as meeting any electromagnetic compatibility (EMC) requirements for the respective environment in which the network components are disposed). The network utilized may also provide adequate data protection and/or data redundancy to ensure operation of the network is not compromised, for example, by data corruption (e.g., through the use of error detection and correction or error control techniques to obviate or reduce errors in transmitted network signals and/or data).

Figure 4:
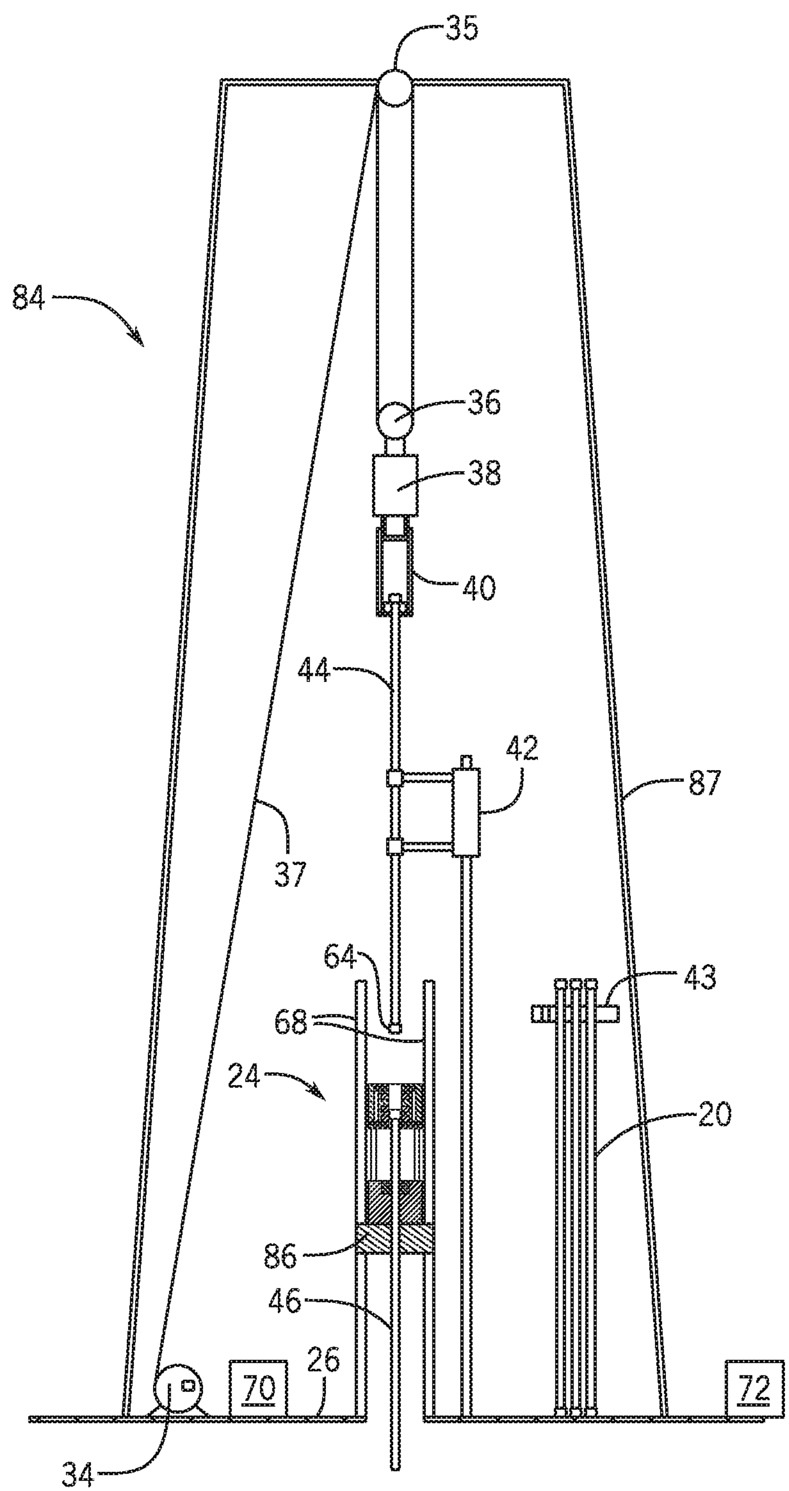
FIG. 4 illustrates a front view a second drilling rig as illustratively presented in FIG. 1, in accordance with an embodiment.
Figure 5:
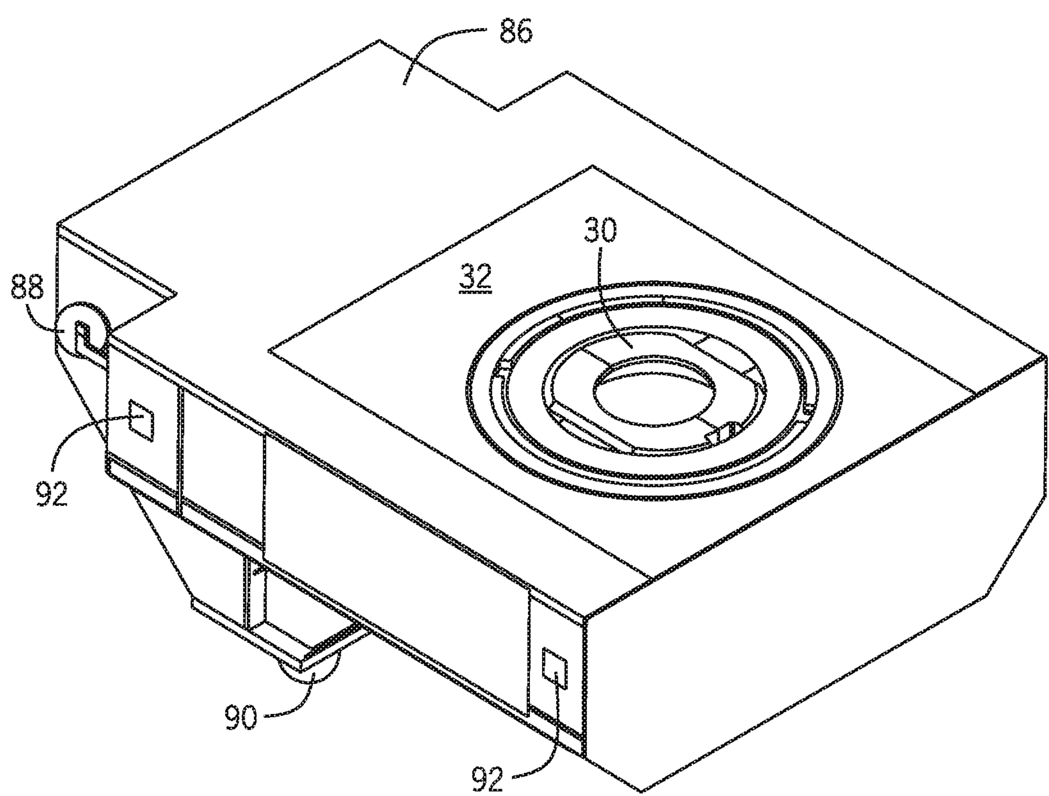
FIG. 5 illustrates an isometric view of a movable platform of FIG. 4, in accordance with an embodiment.

The computing system 70 may operate in conjunction with additional embodiments of drilling rigs. For example, FIG. 4 illustrates another embodiment of a drilling rig 84 that may be utilized in a tripping operation consistent with embodiments of the present disclosure and that may operate in conjunction with the computing system 70 of FIG. 4. As illustrated in FIG. 4, the tripping apparatus 24 is positioned above drill floor 26 in the drilling rig 84 above the wellbore 28 (e.g., the drilled hole or borehole of a well which may be proximate to the drill floor 26 or which may be, in conjunction with FIG. 1, below the wellhead 18). However, as will be discussed in greater detail below, the tripping apparatus 24 may be moved towards and away from the drill floor 26 during a tripping operation. As illustrated, the drilling rig 84 may include one or more of, for example, the tripping apparatus 24, a movable platform 86 (that may include floor slips 30 positioned in rotary table 32, as illustrated in FIG. 5), drawworks 34, a crown block 35, a travelling block 36, a top drive 38, an elevator 40, and a tubular handling apparatus 42. The tripping apparatus 24 may operate to couple and decouple tubular segments (e.g., couple and decouple drill pipe 20 to and from a drill string) while the floor slips 30 may operate to close upon and hold a drill pipe 20 and/or the drill string passing into the wellbore 28. The rotary table 32 may be a rotatable portion that can be locked into positon co-planar with the drill floor 26 and/or above the drill floor 26. The rotary table 32 can, for example, operate to impart rotation to the drill string either as a primary or a backup rotation system (e.g., a backup to the top drive 38) as well as utilize its floor slips 30 to support tubular segments, for example, during a tripping operation or may be a false rotary table that does not impart rotation to the drill string while still allowing for support of tubular segments utilizing its floor slips 30.

The drawworks 34 may be a large spool that is powered to retract and extend drilling line 37 (e.g., wire cable) over a crown block 35 (e.g., a vertically stationary set of one or more pulleys or sheaves through which the drilling line 37 is threaded) and a travelling block (e.g., a vertically movable set of one or more pulleys or sheaves through which the drilling line 37 is threaded) to operate as a block and tackle system for movement of the top drive 38, the elevator 40, and any tubular segment (e.g., drill pipe 20) coupled thereto. In some embodiments, the top drive 38 and/or the elevator 40 may be referred to as a tubular support system or the tubular support system may also additionally include the block and tackle system described above.

The top drive 38 may be a device that provides torque to (e.g., rotates) the drill string as an alternative to the rotary table 32 and the elevator 40 may be a mechanism that may be closed around a drill pipe 20 or other tubular segments (or similar components) to grip and hold the drill pipe 20 or other tubular segments while those segments are moving vertically (e.g., while being lowered into or raised from a wellbore 28) or directionally (e.g., during slant drilling). The tubular handling apparatus 42 may operate to retrieve a tubular segment from a storage location 43 (e.g., a pipe stand) and position the tubular segment during tripping-in to assist in adding a tubular segment to a tubular string. Likewise, the tubular handling apparatus 42 may operate to retrieve a tubular segment from a tubular string and transfer the tubular segment to a storage location (e.g., a pipe stand) during tripping-out to remove the tubular segment from the tubular string.

During a tripping-in operation, the tubular handling apparatus 42 may position a tubular segment 44 (e.g., a drill pipe 20) so that the segment 44 may be grasped by the elevator 40. Elevator 40 may be lowered, for example, via the block and tackle system towards the tripping apparatus 24 to be coupled to tubular segment 46 (e.g., a drill pipe 20) as part of a drill string. In some embodiments, the tripping apparatus 24 may operate as discussed in conjunction with FIG. 2A above during a tripping operation. However, in addition to the operation of the tripping apparatus 24, continuous tripping operations (tripping tubular segments without halting the movement of the tubular string at a fixed position) may be facilitated and/or accelerated through the inclusion of the movable platform 86.

The movable platform 86 may be raised and lowered with a cable and sheave arrangement (e.g., similar to the block and tackle system for movement of the top drive 38) that may include a winch or other drawworks element positioned on the drill floor 26 or elsewhere on the offshore platform 10 or the drilling rig 22. The winch or other drawworks element may be a spool that is powered to retract and extend a line (e.g., a wire cable) over a crown block (e.g., a stationary set of one or more pulleys or sheaves through which the line 37 is threaded) and a travelling block (e.g., a movable set of one or more pulleys or sheaves through which the line 37 is threaded) to operate as a block and tackle system for movement of the movable platform 86 and, thus, the rotary table 32 therein and the tripping apparatus 24 thereon. Additionally and/or alternatively, one or more direct acting cylinders, a suspended winch and cable system, or other internal or external actuation systems may be used to move the movable platform 86 along support 68.

In some embodiments, the support 68 may be one or more guide mechanisms (e.g., guide tracks, such as top drive dolly tracks) that provide support (e.g., lateral support) to the movable platform 86 while allowing for movement towards and away from the drill floor 26. Additionally, as illustrated in FIG. 5, one or more lateral supports 88 may be used to couple the movable platform 86 to the support 68. For example, the lateral supports 88 may be, for example, pads that may be made of Teflon-graphite material or another low-friction material (e.g., a composite material) that allows for motion of the movable platform 86 relative to drill floor 26 and/or the tubular segment support system with reduced friction characteristics. In addition to, or in place of the aforementioned pads, other lateral supports 88 including bearing or roller type supports (e.g., steel or other metallic or composite rollers and/or bearings) may be utilized. The lateral supports 88 may allow the movable platform 86 to interface with a support 68 (e.g., guide tracks, such as top drive dolly tracks) so that the movable platform 86 is movably coupled to the support 68. Accordingly, the movable platform 86 may be movably coupled to a support 68 to allow for movement of the movable platform 86 (e.g., towards and away from the drill floor 26 and/or the tubular segment support system while maintaining contact with the guide tracks or other support 68) during a tripping operation (e.g., a continuous tripping operation).

As further illustrated in FIG. 5, the movable platform 86 may have guide pins 90 or similar devices to provide coarse and fine alignment when moving in and out of the drill floor 26 (e.g., into a planar position with the drill floor 26 or raised above the drill floor 26). Additionally, one or more locking mechanisms 92 may be employed to affix the movable platform 86 into a desired position with respect to the drill floor 26, for example, when a tripping operation is complete or is otherwise not being immediately performed. In this fixed position, the rotary table 32 may operate in conjunction with the top drive 38 and/or as a backup system to the top drive 38. The locking mechanisms 92 may be automatic (e.g., controllable) such that they can be actuated without human contact (e.g., a control signal may cause pins or other locking mechanisms to engage an aperture between the drill floor 26 and the movable platform 86). It is envisioned that the locking mechanisms will interface with the drill floor 26 or an element beneath the drill floor (if the movable platform 86 is to be locked in a position planar with the drill floor 26) and that in some embodiments, the locking mechanisms will be an aperture to be engaged by pins or other locking mechanisms, for example, in the drill floor 26.

Returning to FIG. 4, a computing system 70 may be present and may operate in conjunction with one or more of the tripping apparatus 24, the movable platform 86, an actuating system used to move the tripping apparatus 24 vertically with respect to the movable platform 86 (e.g., to move the tripping apparatus 24 into vertical position to engage, for example, the tubular members), an actuating system used to move the tripping apparatus 24 horizontally across the movable platform 86 (e.g., to move the tripping apparatus 24 into and out of an operational position in which the tripping apparatus 24 is aligned with, for example, the tubular members) and/or an actuating system used to move the movable platform 86. This computing system 70 may also operate to control one or more of the tubular segment support system and/or the tubular handling apparatus 42. It should be noted that the computing system 70 may be similar to the computing system of FIG. 3, with the added aspects of control of the movable platform 86 and/or the floor slips 30 of the movable platform 86.

Figure 6:
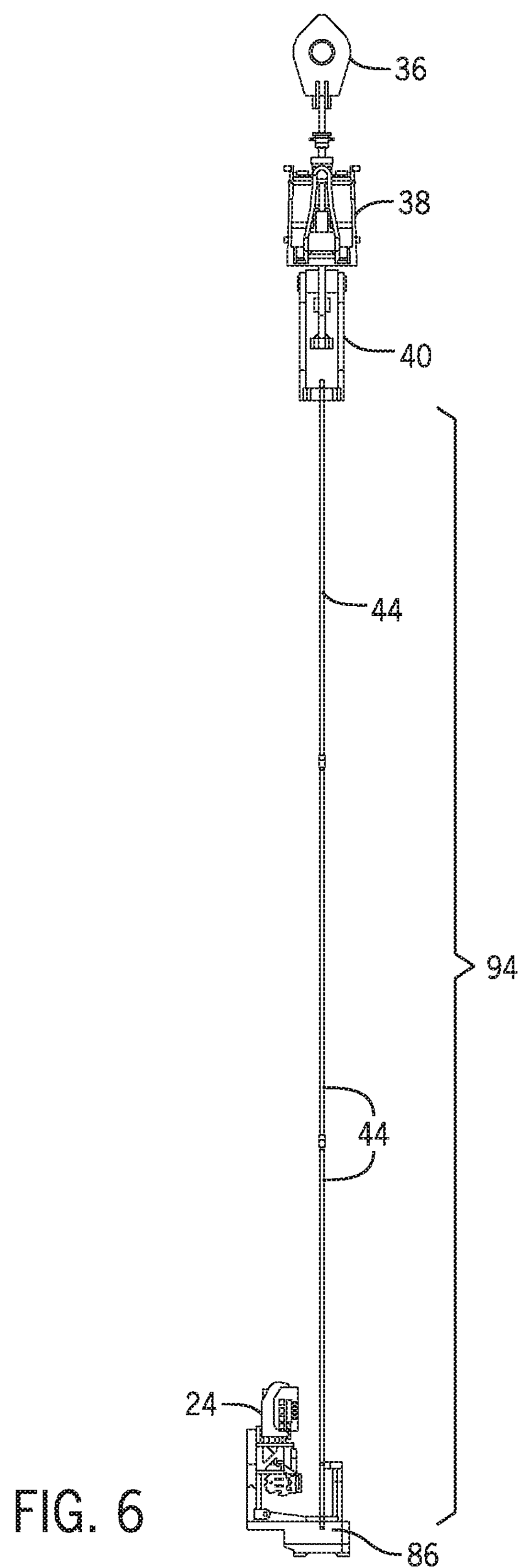
FIG. 6 illustrates a front view of a system inclusive of the tripping apparatus of FIG. 4, in accordance with an embodiment.

Additionally, tripping operations involving singular tubular segments 44 (e.g., drill pipe 20) has been discussed with respect to FIGS. 2-5. However, as illustrated in FIG. 6, it is envisioned that a stand 94 of tubular segments 44 (e.g., two, three, or more tubular segments 44 coupled together) may be the tubular segments being tripped-in or tripped-out. The operation described herein may apply to tripping stands 94 as illustrated in FIG. 6. For example, when ascertaining the tripping speed limits for a tripping operation, control of the tripping apparatus 24, the tubular support system, the tubular handling apparatus 42, and/or the movable platform 86 may be controlled by the computer system 70. For example, an output signal generated by the computer system 70 may be applied by the computer system 70. For example, the computer system 70 (e.g., the processing device 74 or the processing device 74 operating in conjunction with software systems implemented as computer executable instructions stored in a non-transitory machine readable medium of computing system 70, such as memory 76, and that may be executed) may control the operation of local controllers or may operate as a control system itself so as to transmit one or more control signals to control where and when to move the tripping apparatus 24 into position (e.g., tool joint recognition) to perform a tripping operation as part of a tripping operation performed at a predetermined or calculated speed.

Additionally or alternatively, the computer system 70 may operate as a control system itself so as to transmit a control signal to control the activation of one or more slips 30 and/or 48 to secure one of the stands 94, control the activation of the tubular handling apparatus 42, the tubular support system, and/or the movable platform 86 so the aforementioned components function together as a continuous tripping system to operate a tripping operation at a predetermined or calculated speed. Likewise, external control systems may instead receive one or more output control signals from the computer system 70 and use the output control signals, respectively, to control the activation of one or more slips 30 and/or 48 to secure one of the stands 94, control the activation of the tubular handling apparatus 42, the tubular support system, and/or the movable platform 86 so the aforementioned components function together as a continuous tripping system to operate a tripping operation at a predetermined or calculated speed. Determination of the predetermined or calculated speed by the computer system 70 will be described in greater detail below.

The computing system 70 may operate as a limiter to provide a variable upper threshold speed at which a tripping operation is not to exceed based on, for example, sensitivities of surge and swab pressure characteristics and/or pressure characteristics of the well. In some embodiments, pressure characteristics of the well may be measurable. For example, a formation a leak-off test of the well can be undertaken to determine the maximum pressure or mud weight that may be applied to a well. In some embodiments, the measured pressures (i.e., the pressure characteristics of the well) may include determination of a fracture pressure and a pore pressure, both of which may be observed and stored in the computing system as threshold values (e.g., whereby the fracture pressure is not to be exceeded by the well pressure and the well pressure is not to fall below the pore pressure).

Additionally, sensitivities of surge and swab pressure characteristics may be determined based on a set of input values. For example, these input values that affect the surge and swab pressure characteristics may include, for example, one or more of a tripping speed, a pipe end condition as open or closed, a well depth, a size of the drill pipe 20, a bit jet area, rheological properties of the drilling fluid (mud) utilized, or other characteristics. The tripping speed may include to the RIH and POOH tripping speed, respectively. The pipe end condition as open or closed may include to a flowrate as related to the displacement of an open ended drill pipe 20 as a volume of fluid that will be displaced by the drill pipe 20 when placed into the fluid with an open end allowing the drill pipe 20 to receive the fluid and a flowrate as related to the displacement of a closed ended drill pipe 20 as a volume of fluid that will be displaced by the drill pipe 20 when placed into the fluid with an closed end preventing the drill pipe 20 from receiving the fluid. The well depth may include effects on surge and swab pressures in relation to differing well depths. The size of the drill pipe 20 may include a measurement of a distance of the drill pipe such as the diameter or other physical aspects of the drill pipe 20. The bit jet area may include a measurement of a flow area of a bit nozzle that allows drilling fluid to exit into the well. The rheological properties of the mud may include, for example, one or more of the density of the mud utilized, a mud plastic viscosity as related to a flow resistance of the mud, which may be caused by mechanical friction within the mud, and a yield point of the mud as related to a flow resistance of the mud, which may be caused by electrochemical forces within the mud, and/or additional mud characteristics.

In some embodiments, the impact of the pipe end condition as open or closed, the well depth, the size of the drill pipe 20, the bit jet area, and the rheological properties of the drilling fluid (mud) utilized may vary in relation to the tripping speed and, therefore, may operate to adjust the effects of the surge and swab pressure characteristics at differing tripping speeds as depths of the well increase (i.e., leading to a more complete representation of the sensitivities of surge and swab pressure characteristics at various tripping speeds relative to a determination of the sensitivities of surge and swab pressure characteristics at various tripping speeds alone). Accordingly, FIGS. 7-9 illustrate various tripping speeds and their impact with respect to surge and swab pressure characteristics affecting pressure characteristics of the well.

Figure 7:
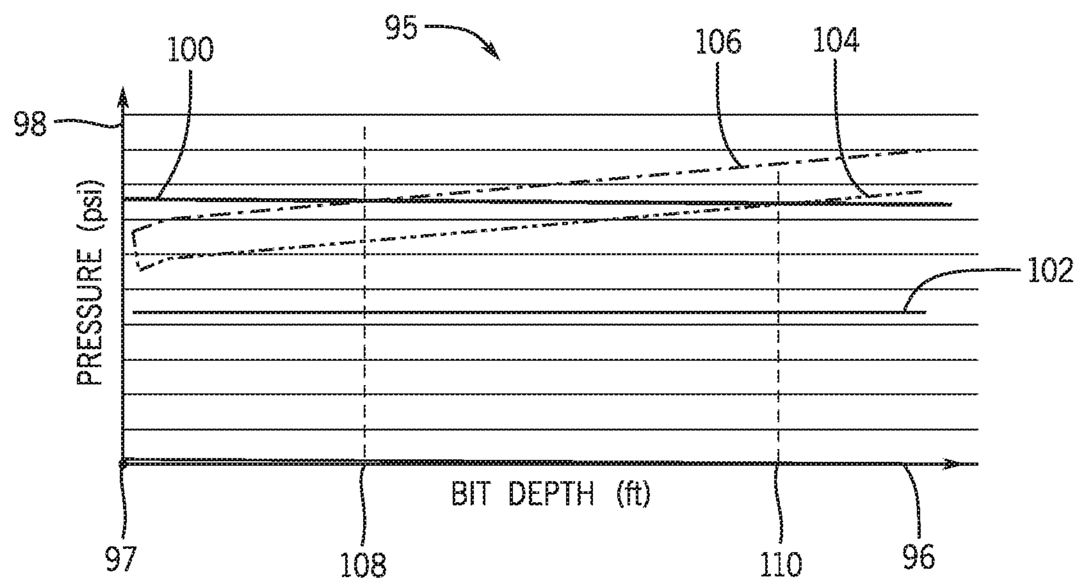
FIG. 7 illustrates a graph of mud loss due to a running in the hole continuous tripping operation and a running in the hole non-continuous tripping operation at a common speed, in accordance with an embodiment.

FIG. 7 illustrates a graph 95 of mud loss due to an RIB continuous tripping operation and an RIH non-continuous tripping operation. As illustrated, the x-axis 96 represents bit depth in feet increasing from the origin 97 and the y-axis 98 represents pressure in pounds per square inch (psi) increasing from the origin 97. The fracture pressure 100 of the well and the pore pressure of the well 102 are additionally illustrated in addition to the pressure in the well due to an RIH continuous tripping operation 104 at a first speed and the pressure in the well due to an RIH non-continuous tripping operation 106 at the same first speed. At depth 108, the RIB non-continuous tripping operation 106 pressure at the first speed (in feet per minute) exceeds the fracture pressure 100 of the well, which may lead to a well event.

Similarly the graph 95 illustrates that at depth 110 (greater than depth 108), the RIH continuous tripping operation 104 pressure at the first speed (in feet per minute) exceeds the fracture pressure 100 of the well. Thus, graph 95 illustrates a shorter mud loss duration for an RIH continuous tripping operation 104, which would lead to lower mud loss risks and the associated safety gains. Additionally, this graph 95 illustrates that the RIB continuous tripping operation 104 may be faster than the RIH non-continuous tripping operation 106, thus leading to advantageous tripping time gains and, accordingly, reduced down time for the well (e.g., to match the lower mud loss of the RIB continuous tripping operation 104, the RIH non-continuous tripping operation 106 would need to be run at a slower rate than the RIB continuous tripping operation 104). Similar advantages may be present in POOH continuous tripping operations.

Figure 8:
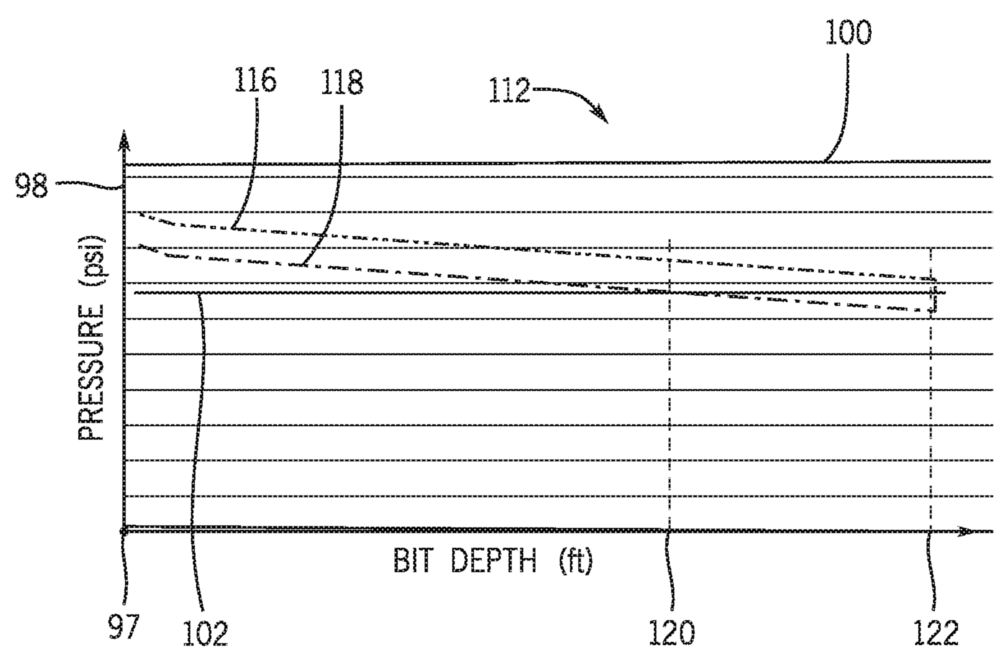
FIG. 8 illustrates a graph of influx due to a pulling out of the hole continuous tripping operation and pulling out of the hole non-continuous tripping operation at a common speed, in accordance with an embodiment.
Figure 9:
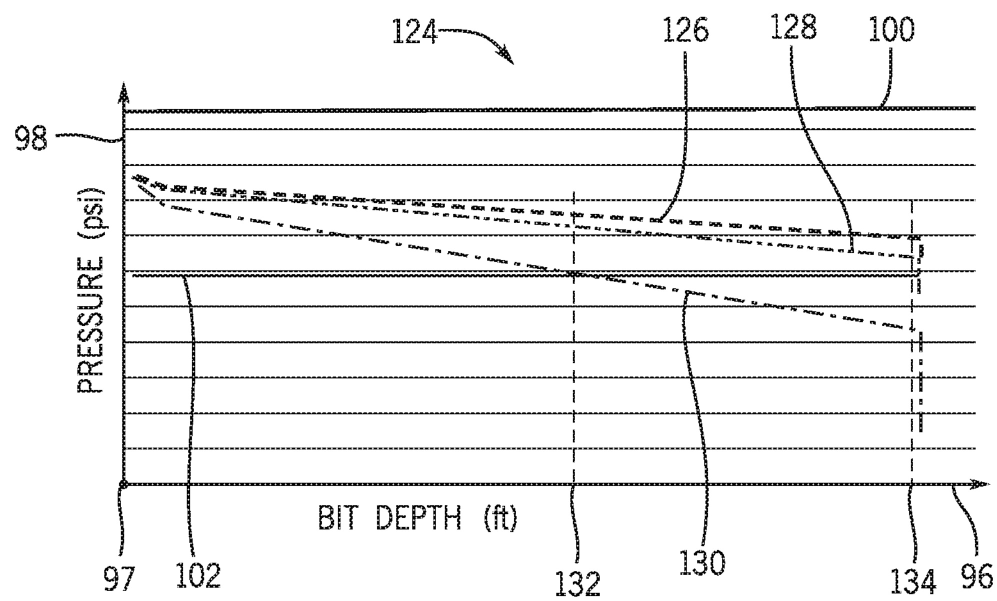
FIG. 9 illustrates a graph of the effects of tripping speeds during a pulling out of the hole continuous tripping operation at various speeds, in accordance with an embodiment.

FIG. 8 illustrates a graph 112 of influx due to a POOH continuous tripping operation and a POOH non-continuous tripping operation. As illustrated, the x-axis 96 represents bit depth in feet increasing from the origin 97 and the y-axis 98 represents pressure in pounds per square inch (psi) increasing from the origin 97. The fracture pressure 100 of the well and the pore pressure of the well 102 are additionally illustrated in addition to the pressure in the well due to a POOH continuous tripping operation 116 at a first speed and the pressure in the well due to a POOH non-continuous tripping operation 118 at the same first speed. At depth 120, the POOH non-continuous tripping operation 118 pressure at the first speed (in feet per minute) falls below the pore pressure 102 of the well, which may lead to a well event.

Similarly the graph 112 illustrates that at depth 122 (greater than depth 120), the POOH continuous tripping operation 116 pressure at the first speed (in feet per minute) falls below the pore pressure 102 of the well. Thus, graph 112 illustrates a shorter influx duration for a POOH continuous tripping operation 116, which would lead to reduced well kick risks (e.g., a well control event in which the pressure found within the drilled rock is higher than the mud pressure acting on the borehole or rock face such that fluids are forced into the wellbore 28) and the associated safety gains. Additionally, this graph 112 illustrates that the POOH continuous tripping operation 116 may be faster than the POOH non-continuous tripping operation 118, thus leading to advantageous tripping time gains and, accordingly, reduced down time for the well (e.g., to match the shorter influx duration of the POOH continuous tripping operation 116, the POOH non-continuous tripping operation 118 would need to be run at a slower rate than the POOH continuous tripping operation 116).

FIG. 9 illustrates a graph 124 of the effects of tripping speeds during a POOH continuous tripping operation at various speeds. As illustrated, the x-axis 96 represents bit depth in feet increasing from the origin 97 and the y-axis 98 represents pressure in pounds per square inch (psi) increasing from the origin 97. The fracture pressure 100 of the well and the pore pressure of the well 102 are additionally illustrated in addition to the pressure in the well due to a POOH continuous tripping operation at a first speed ("x"), the pressure in the well due to a POOH continuous tripping operation 128 at a second speed greater than the first speed (e.g., the second speed having a speed of approximately 1.25x, 1.5x. 1.75x, 2x, or another value), and the pressure in the well due to a POOH continuous tripping operation 130 at a third speed greater than the first speed and greater than the second speed (e.g., the third speed having a speed of approximately 2.25x, 2.5x. 2.75x, 3x, 3.25x, 3.5x. 3.75x, 4x or another value).

At depth 132, the pressure in the well due to the POOH continuous tripping operation 130 at the third speed (in feet per minute) falls below the pore pressure 102 of the well, which may lead to a well event. Similarly, the graph 124 illustrates that at depth 134 (greater than depth 132), the pressure in the well due to the POOH continuous tripping operation 128 pressure at the second speed (in feet per minute) falls below the pore pressure 102 of the well. However, at depth 134, the pressure in the well due to the POOH continuous tripping operation 126 pressure at the first speed (in feet per minute) remains above the pore pressure 102 of the well.

Thus, graph 124 illustrates that the pressure in the well due to the POOH continuous tripping operation 126 pressure at the first speed will not fall below the pore pressure 102 of the well at the illustrated depths, the pressure in the well due to the POOH continuous tripping operation 128 pressure at the second speed will fall below the pore pressure 102 of the well at depth 134, and the pressure in the well due to the POOH continuous tripping operation 130 pressure at the third speed will fall below the pore pressure 102 of the well at depth 132. Accordingly, reduced well kick risks and the associated safety gains may be realized by implementing the POOH continuous tripping operation 126 at the first speed. However, the slower tripping rate relative to the POOH continuous tripping operation 128 at the second speed and the POOH continuous tripping operation 130 at the third speed leading to reductions in advantageous tripping time gains and, accordingly, increased down time for the well when the POOH continuous tripping operation 126 at the first speed is implemented.

Accordingly, in some embodiments, the computing system 70 may operate as a limiter to provide a variable upper threshold speed at which a tripping operation is not to exceed based on, for example, sensitivities of surge and swab pressure characteristics and/or pressure characteristics of the well. This variable upper threshold speed is illustrated in the graph 135 of FIG. 10 with respect to a POOH continuous tripping operation. As illustrated, the x-axis 96 represents bit depth in feet increasing from the origin 97 and the y-axis 98 represents pressure in pounds per square inch (psi) increasing from the origin 97. A first depth 136 is illustrated at or near the origin 97 (e.g., at approximately 0 feet). A second depth 138 greater than the first depth 136, a third depth 140 greater than the first depth 136 and the second depth 138, and a fourth depth 142 greater than the first depth 136, the second depth 138, and the third depth 140 are also illustrated. A variable tripping speed 144 of the POOH continuous tripping operation is further illustrated in FIG. 10.

Figure 10:
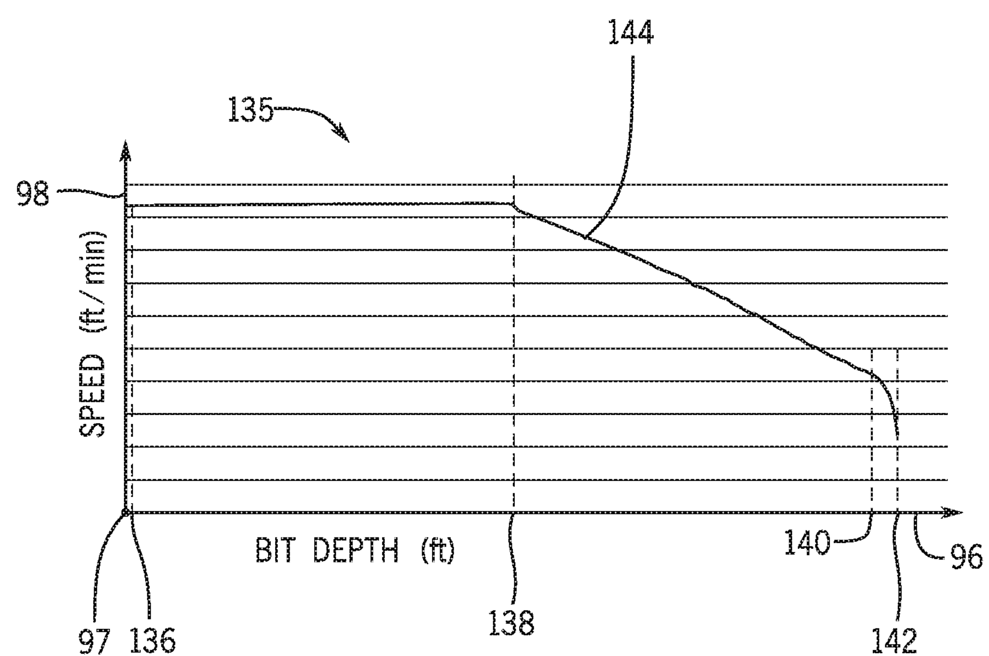
FIG. 10 illustrates a graph of modified tripping speeds during a pulling out of the hole continuous tripping operation, in accordance with an embodiment.

In connection with the graph 124 of FIG. 9, the variable tripping speed 144 of the POOH continuous tripping operation illustrated in the graph 135 of FIG. 10 may be approximately equal to the POOH continuous tripping operation 126 at the first speed at fourth depth 142. The variable tripping speed 144, for example, may continue to be approximately equal to the POOH continuous tripping operation 126 at the first speed between the fourth depth 142 and the third depth 140 so that the pressure of the POOH continuous tripping operation 126 at the first speed will not fall below the pore pressure 102 of the well. Alternatively, as the depth decreases between the fourth depth 142 and the third depth 140, the variable tripping speed 144 of the POOH continuous tripping operation may increase in speed at a rate that maintains POOH continuous tripping operation pressure of the well associated with the variable tripping speed 144 above the pore pressure 102 of the well.

As further illustrated in the graph 135, the variable tripping speed 144 of the POOH continuous tripping operation may be approximately equal to the POOH continuous tripping operation 128 at the second speed at third depth 140. The variable tripping speed 144, for example, may continue to be approximately equal to the POOH continuous tripping operation 128 at the second speed between the third depth 140 and the second depth 138 so that the pressure of the POOH continuous tripping operation 128 at the second speed will not fall below the pore pressure 102 of the well. Alternatively, as the depth decreases between the third depth 140 and the second depth 138, the variable tripping speed 144 of the POOH continuous tripping operation may increase in speed at a rate that maintains POOH continuous tripping operation pressure of the well associated with the variable tripping speed 144 above the pore pressure 102 of the well.

Likewise, the variable tripping speed 144 of the POOH continuous tripping operation may be approximately equal to the POOH continuous tripping operation 130 at the third speed at second depth 138. The variable tripping speed 144, for example, may continue to be approximately equal to the POOH continuous tripping operation 130 at the third speed between the second depth 138 and the first depth 136 so that the pressure of the POOH continuous tripping operation 130 at the third speed will not fall below the pore pressure 102 of the well. Alternatively, as the depth decreases between the second depth 138 and the first depth 136, the variable tripping speed 144 of the POOH continuous tripping operation may increase in speed at a rate that maintains POOH continuous tripping operation pressure of the well associated with the variable tripping speed 144 above the pore pressure 102 of the well.

Thus, graph 135 illustrates that the pressure in the well due to the POOH continuous tripping operation at the variable tripping speed 144 will not fall below the pore pressure 102 of the well at the illustrated depths. Accordingly, reduced well kick risks and the associated safety gains may be realized by implementing the POOH continuous tripping operation 126 at the variable tripping speed 144 across the depths between the first depth 136 and the fourth depth 142. Moreover, the increased tripping rate relative to the POOH continuous tripping operation at the first speed (as illustrated in FIG. 9) leads to increases in advantageous tripping time gains and, accordingly, decreased down time for the well relative to implementation of the POOH continuous tripping operation at the first speed. Additionally, while FIGS. 9 and 10 discuss POOH continuous tripping operation, it is envisioned that a similar operation may be performed in connection with an RIH continuous tripping operation.

Figure 11:
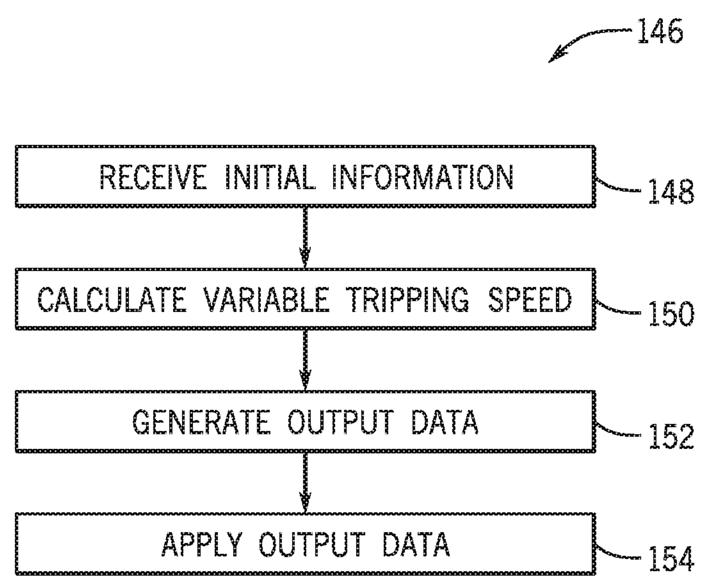
FIG. 11 illustrates a flow chart used in conjunction with a tripping speed modification system, in accordance with an embodiment.

FIG. 11 illustrates a flow chart 146 used in conjunction with a tripping speed modification system, in accordance with an embodiment. Particularly, the processing device 74 may operate in conjunction with software systems implemented as computer executable instructions (e.g., code) stored in a non-transitory machine readable medium of computing system 70, such as memory 76, that may be executed to receive information (e.g., signals or data) related to sensitivities of surge and/or swab pressures characteristics as well as well pressure characteristics to determine the variable tripping speed 144 as well as implement the variable tripping speed as a control parameter for a tripping operation.

In step 148, initial information may be received and/or calculated by the computing system 70 regarding plans for days tripping operations will occur and the type of tripping operations to occur. Additionally, the computing system in step 148 may receive or determine well pressures, such as a fracture pressure and a pore pressure of a well, both of which may be observed and stored in the computing system 70 as threshold values (e.g., whereby the fracture pressure is not to be exceeded by the well pressure and the well pressure is not to fall below the pore pressure). Additionally, a set of input values that affect the surge and swab pressure characteristics may be received in step 148 by the computing system 70 that may include, for example, one or more of a tripping speed, a pipe end condition as open or closed, a well depth, a size of the drill pipe 20, a bit jet area, rheological properties of the drilling fluid (mud) utilized, or other characteristics. These input values may be stored, for example, in the memory 76 of the computing system 70.

In step 150, the initial information from step 148 may be utilized (for example, by the processing device 74 or the processing device 74 operating in conjunction with software systems implemented as computer executable instructions stored in a non-transitory machine readable medium of computing system 70, such as memory 76, that may be executed) to calculate a variable tripping speed for one or more POOH continuous tripping operations scheduled and for one or more RIH continuous tripping operations scheduled. Thus, each respective POOH continuous tripping operation and RIH continuous tripping operation may have a corresponding variable tripping speed assigned to it as a limited tripping speed not to be exceed (e.g., to maximize the speed of the respective tripping operation while maintaining the well pressure below the fracture pressure and above the pore pressure of the well at the respective depths for the respectively scheduled tripping operations). This calculated variable tripping speed for each tripping operation can be stored, for example, in the memory 76 until the respective tripping operation is scheduled to begin. Alternatively, the variable tripping speed can be calculated dynamically by the processing device 74 or the processing device 74 operating in conjunction with software systems implemented as computer executable instructions based on the stored input values from step 148 as the respective tripping operations are to begin.

In step 152, the computer system 70 (e.g., the processing device 74 or the processing device 74 operating in conjunction with software systems implemented as computer executable instructions stored in a non-transitory machine readable medium of computing system 70, such as memory 76, that may be executed) may apply a respective calculated variable tripping speed to its corresponding tripping operation to generate output data from the computer system 70. In some embodiments, this output data may be an indication of the speeds at which a tripping operation may operate at for a period of time and at corresponding depths. In some embodiments, the output data may be used by respective controllers as a determined tripping schedule that can be used to initiate or control movement and/or operation of the tripping apparatus 24 and/or the associated tripping elements (e.g., the drawworks 34, the top drive 38, the elevator 40, and/or the tubular handling apparatus 42) to facilitate a make-up or break-out (e.g., tripping) operation at varying speeds that match the determined variable tripping speed for the respective tripping operation undertaken. Alternatively, the generated output data in step 152 may be transmitted by the computing system 70 or by the main control system 72 as respective control signals to initiate or control movement and/or operation of the tripping apparatus 24 and/or the associated tripping elements (e.g., the drawworks 34, the top drive 38, the elevator 40, and/or the tubular handling apparatus 42) to facilitate a make-up or break-out (e.g., tripping) operation at varying speeds that match the determined variable tripping speed for the respective tripping operation undertaken.

In step 154, the output signal generated by the computer system 70 may be applied by the computer system 70, the main control system 72, or the aforementioned local controllers of, for example, the tripping apparatus 24 and/or the associated tripping elements (e.g., the drawworks 34, the top drive 38, the elevator 40, and/or the tubular handling apparatus 42) to facilitate a make-up or break-out (e.g., tripping) operation at varying speeds that match the determined variable tripping speed for the respective tripping operation undertaken. In some embodiments, this process in step 154 allows for automatic control of the continuous tripping system to insure a limited speed is not exceeded.

This written description uses examples to disclose the above description to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Accordingly, while the above disclosed embodiments may be susceptible to various modifications and alternative forms, specific embodiments have been shown by way of example in the drawings and have been described in detail herein. However, it should be understood that the embodiments are not intended to be limited to the particular forms disclosed. Rather, the disclosed embodiment are to cover all modifications, equivalents, and alternatives falling within the spirit and scope of the embodiments as defined by the following appended claims.

What is claimed is:

1. A system, comprising:

a processing device configured to:

determine a tripping operation to be undertaken;

calculate a variable tripping speed for the tripping operation to vary a speed of the tripping operation; and generate an output to control movement of a movable tripping apparatus comprising an iron roughneck towards and away from a drill floor to implement the tripping operation at the variable tripping speed, wherein the tripping operation comprises movement of a first tubular segment and a second tubular segment towards the drill floor while being made up by the iron roughneck without halting or movement of the first tubular segment and the second tubular segment away from the drill floor while being broken out by the iron roughneck without halting, wherein the processing device is configured to calculate the variable tripping speed to implement the tripping operation via control of the movement of the movable tripping apparatus comprising the iron roughneck towards and away from the drill floor based on a depth of a well into which a portion of a pipe of a tubular string comprising at least one of the first segment and the second segment is moving during the tripping operation to establish a speed of the tripping operation while maintaining a well pressure below a first threshold value and above a second threshold value less than the first threshold value at respective depths of the well.

2. The system of claim 1, wherein the processing device is configured to calculate the variable tripping speed additionally based on a pressure value of a well as the pipe of the tubular string comprising at least one of the first segment and the second segment is moving relative to the well during the tripping operation.

3. The system of claim 1, wherein the processing device is configured to calculate the variable tripping speed as an upper threshold speed of the tripping operation.

4. The system of claim 1, wherein the processing device is configured to determine the tripping operation as comprising running pipe into a well.

5. The system of claim 1, wherein the processing device is configured to determine the tripping operation as comprising pulling pipe out of a well.

6. The system of claim 1, wherein the processing device is configured to generate a tripping schedule to limit the speed of the tripping operation to predetermined levels at predetermined times.

7. The system of claim 6, wherein the processing device is configured generate the output based upon the tripping schedule.

8. The system of claim 1, wherein the processing device is configured to generate a tripping schedule to limiting the speed of the tripping operation to predetermined levels at predetermined well depths.

9. The system of claim 8, wherein the processing device is configured generate the output based upon the tripping schedule.

10. The system of claim 1, wherein the processing device is configured to calculate the variable tripping speed dynamically during the tripping operation.

11. A device, comprising:

an input configured to receive a signal indicative of a threshold pressure value of a well; and a processor configured to:

calculate a variable tripping speed at which to continuously trip drill pipe into the well, wherein the variable tripping speed is calculated so as to maintain a pressure in the well above the threshold pressure value of the well during a continuous tripping operation; and generate an output to automatically control a speed at which a continuous tripping system continuously trips drill pipe into the well by making-up tubular segments without halting the movement of the tubular segments at a fixed position so as not to exceed the variable tripping speed via controlling movement of a movable tripping apparatus comprising an iron roughneck of the continuous tripping system towards the drill floor while the iron roughneck is making-up the tubular segments.

12. The device of claim 11, wherein the processor is configured to calculate the variable tripping speed based on a depth of the well into which a portion of the drill pipe is moving.

13. The device of claim 11, wherein the processor is configured to calculate the variable tripping speed based on the threshold pressure value of the well.

14. The device of claim 11, wherein the processor is configured to generate a tripping schedule to limit the speed at which the continuous tripping system continuously trips drill pipe into the well to predetermined levels at predetermined times.

15. The device of claim 14, wherein the processor is configured generate the output to automatically control operation of the continuous tripping system based upon the tripping schedule.

16. The device of claim 11, wherein the processor is configured to:

calculate a second variable tripping speed at which to continuously trip drill pipe out of the well, wherein the second variable tripping speed is calculated so as to maintain the pressure in the well above the threshold pressure value of the well; and generate an second output to automatically control a second speed at which the continuous tripping system continuously trips drill pipe out of the well by breaking-out tubular segments without halting the movement of the tubular segments at a second position so as not to exceed the second variable tripping speed.

17. A tangible, non-transitory computer-readable medium having computer executable code stored thereon, the computer executable code comprising instructions to cause a processor to:

determine a tripping operation to be undertaken;

calculate a variable tripping speed for the tripping operation to vary a speed of the tripping operation based on a depth of a well into which a portion of a pipe of a tubular string comprising at least one of the first segment and the second segment is moving during the tripping operation to establish a speed of the tripping operation while maintaining a well pressure below a first threshold value and above a second threshold value less than the first threshold value at respective depths of the well; and generate an output to control movement of a movable tripping apparatus comprising an iron roughneck towards and away from a drill floor to implement the tripping operation at the variable tripping speed, wherein the tripping operation comprises movement of a first tubular segment and a second tubular segment towards the drill floor while being made up by the iron roughneck without halting or movement of the first tubular segment and the second tubular segment away from the drill floor while being broken out by the iron roughneck without halting.

18. The tangible, non-transitory computer-readable medium of claim 17, wherein the computer executable code comprises instructions to cause the processor to calculate the variable tripping speed based on a pressure value of a well as a pipe of a tubular string comprising at least one of the first segment and the second segment is moving relative to the well during the tripping operation.

19. The tangible, non-transitory computer-readable medium of claim 17, wherein the computer executable code comprises instructions to cause the processor to generate a tripping schedule to limiting the speed of the tripping operation to predetermined levels at predetermined times and predetermined well depths.

* * * * *